(12) United States Patent
Lee et al.

(10) Patent No.: US 6,961,488 B2
(45) Date of Patent: Nov. 1, 2005

(54) OPTICAL SWITCH AND METHOD OF PRODUCING THE SAME

(75) Inventors: Hyun Kee Lee, Kyungki-do (KR); Sung Cheon Jung, Kyungki-do (KR); Yoon Shik Hong, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 69 days.

(21) Appl. No.: 10/689,604

(22) Filed: Oct. 22, 2003

(65) Prior Publication Data

US 2004/0264848 A1 Dec. 30, 2004

(30) Foreign Application Priority Data

Jun. 25, 2003 (KR) ................................ 10-2003-0041390

(51) Int. Cl.[7] ................................................ G02B 6/42
(52) U.S. Cl. .............................. 385/22; 385/16; 385/18; 385/140
(58) Field of Search ............................. 385/16–24, 140

(56) References Cited

U.S. PATENT DOCUMENTS

| 6,124,663 A | 9/2000 | Haake et al. |
| 6,465,929 B1 | 10/2002 | Levitan et al. |
| 6,618,520 B2 | 9/2003 | Tew ............................ 385/18 |
| 2002/0044721 A1 * | 4/2002 | Bjorklund ..................... 385/18 |

FOREIGN PATENT DOCUMENTS

CN 2522882 Y 11/2002

* cited by examiner

*Primary Examiner*—Phan T. H. Palmer
(74) *Attorney, Agent, or Firm*—Lowe Hauptman & Berner, LLP (57) ABSTRACT

Disclosed is herein an optical switch, which has advantages of an MEMS optical switch and a waveguide optical switch including a small electric power consumption, an easy packaging process, and a fast switching speed. The optical switch includes an input waveguide connected to an input optical fiber through which an optical signal is inputted, and a plurality of output waveguides connected to a plurality of output optical fibers through which the optical signal is outputted. An actuator is positioned between the input waveguide and the output waveguides, and has an MEMS structure including a fixed part and a moving part connected to the fixed part by a spring to move by a predetermined force. Additionally, a plurality of moving waveguides are assembled with the moving part of the actuator and move in the same direction as the movement of the moving part in such a way that first ends of the moving waveguides correspond in position to the input waveguide, and second ends of the moving waveguides correspond in position to the output waveguides.

6 Claims, 7 Drawing Sheets

PRIOR ART

OPTICAL SWITCH AND METHOD OF PRODUCING THE SAME

BACKGROUND OF THE INVENTION

1. Field of the Invention

The present invention relates, in general, to an optical switch used as essential parts of a wavelength division multiplexing (WDM) optical communications network and, more particularly, to an optical switch, which has a fast response speed, consumes a small amount of an electric power, and is useful in a precise and easy packaging process because it is possible to connect the optical switch to optical fibers according to a simple process, and a method of producing the same.

2. Description of the Related Art

Generally, an optical switch functions to change a path of an optical signal transmitted through an optical fiber in a WDM optical communications network, and current studies of the optical switch are being concentrated on an optical switch realized according to a micro electro mechanical systems (MEMS) technology and an optical switch realized using the refraction change due to heat energy.

Figure 1:
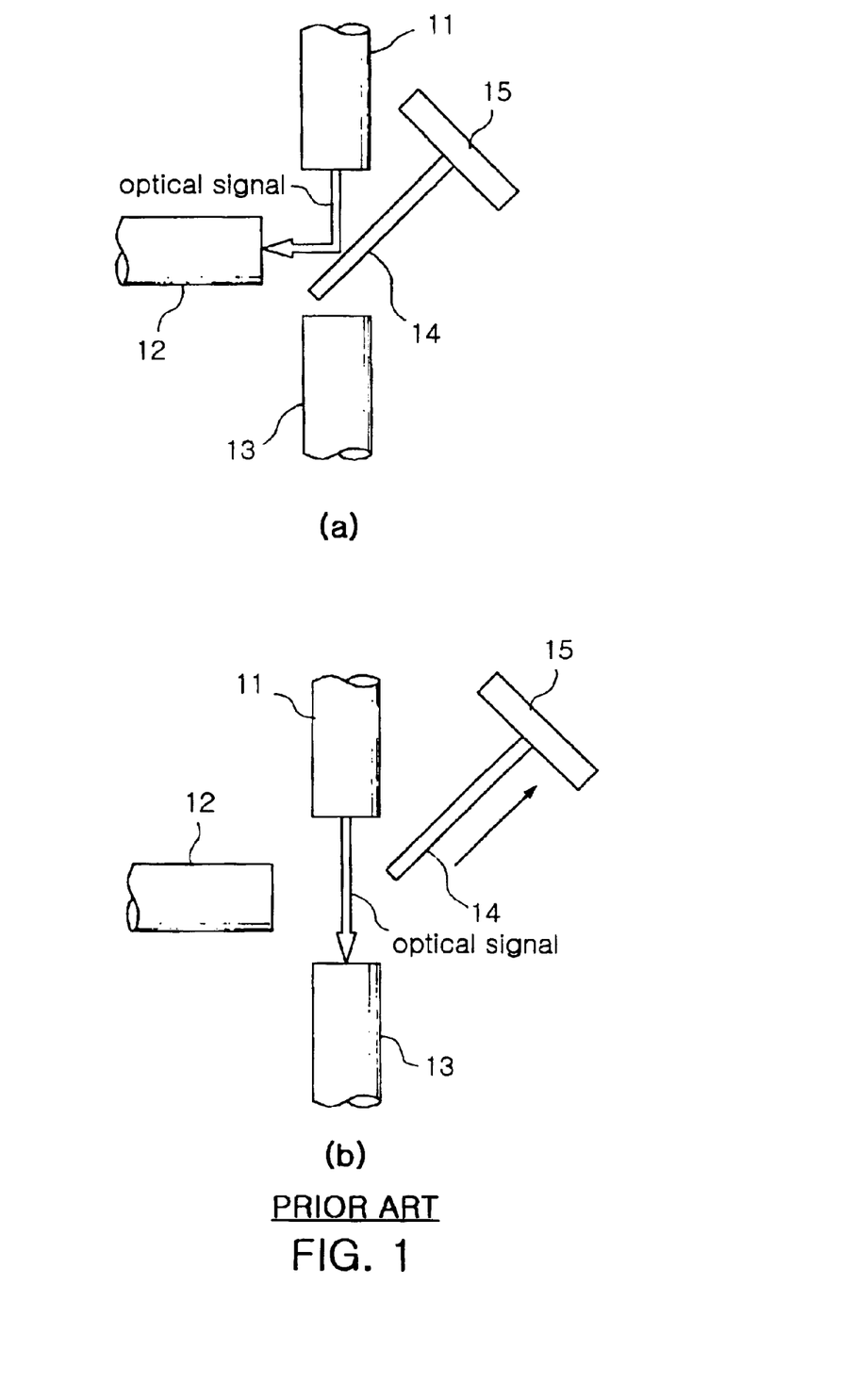
FIGS. 1A and 1B illustrate structure and operation of a conventional MEMS optical switch.

In an MEMS optical switch, a beam passing through input optical fibers is reflected by a fine mirror controlled using an actuator having a MEMS structure to be transmitted in two or more directions, and a schematic structure of the MEMS optical switch is illustrated in FIG. 1.

With reference to FIGS. 1A and 1B, the MEMS optical switch includes an input optical fiber 11 through which an optical signal is inputted, a first output optical fiber 12 positioned perpendicular to the input optical fiber 11, a second output optical fiber 13 positioned on the same straight line as the input optical fiber 11, a fine mirror 14 positioned between the input optical fiber 11 and the second output optical fiber 13 and reflecting the optical signal to switch a direction of the optical signal, and an actuator 15 driving the fine mirror 14. When the fine mirror 14 is positioned between the input optical fiber 11 and the second output optical fiber 13 using the actuator 15, the optical signal passing through the input optical fiber 11 is reflected by the fine mirror 14 to advance through the first output optical fiber 12. On the other hand, when the fine mirror 14 is withdrawn from a space between the input optical fiber 11 and the second output optical fiber 13 using the actuator 15, the optical signal passing through the input optical fiber 11 advances through the second output optical fiber 13 without being reflected by the fine mirror 14.

In other words, the optical signal is switched by the fine mirror 14 driven by the actuator 15 having the MEMS structure. Since a size of the actuator is very small, the MEMS optical switch is advantageous in that a switching speed is fast and an electric power is consumed in a small amount. However, the MEMS optical switch has a cumbersome problem in that the input optical fiber and output optical fibers must be precisely arranged in a packaging process.

Figure 2:
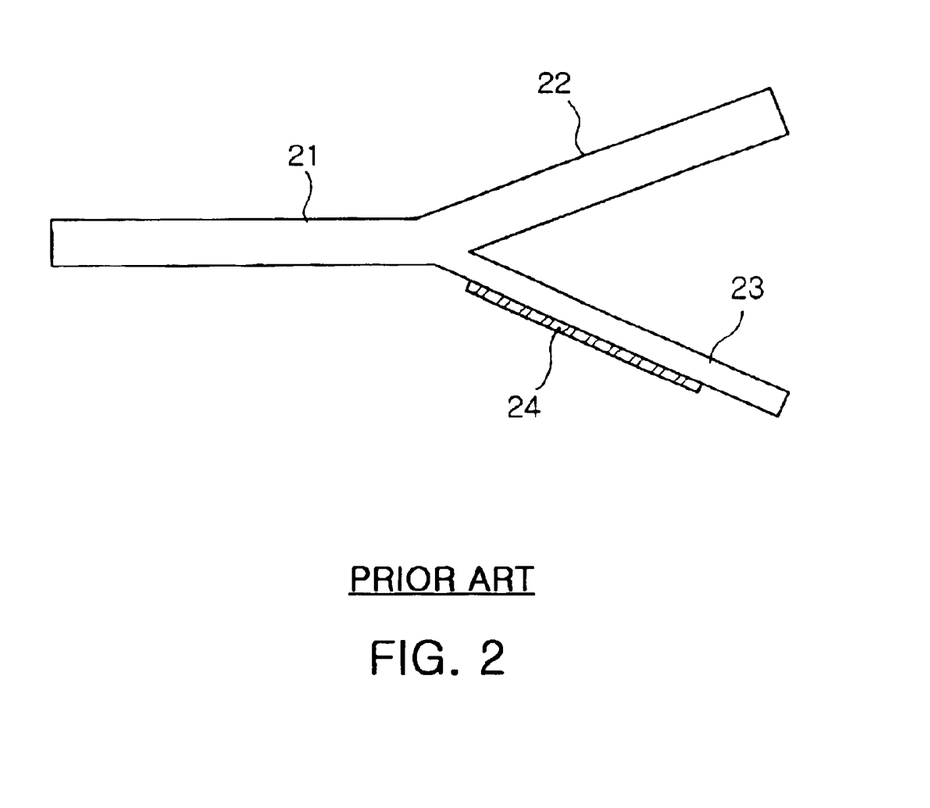
FIG. 2 illustrates a structure of a conventional waveguide optical switch.

Referring to FIG. 2, there is illustrated a conventional waveguide optical switch using the refraction change of a waveguide. The conventional waveguide optical switch is structured such that an input waveguide 21, and a first and a second output waveguide 22, 23 are integrated with each other in a Y-shape, the first output waveguide 22 is larger than the second output waveguide 23 in diameter, and a heating unit 24 is attached to the second output waveguide 23. When the heating unit 24 is turned off, an optical signal passing through the input waveguide 21 advances through the first output waveguide 22. On the other hand, when the heating unit 24 is turned on, the second output waveguide 23 is heated by the heating unit 24, thus a refraction ratio is reduced at the second output waveguide 23 and the optical signal passing through the input waveguide 21 advances through the second output waveguide 23, thereby a path of the optical signal is switched.

The conventional waveguide optical switch is advantageous in that waveguide elements are directly mounted on a wafer, thus the integration of waveguide elements is easily conducted, and it is possible to accomplish a packaging process by attaching optical fibers to an input and an output part of the waveguide optical switch without separately arranging the optical fibers. However, the conventional waveguide optical switch has disadvantages in that electric power is consumed in a large amount because heat energy is used to switch the path of the optical signal, and a switching speed is undesirably slow.

SUMMARY OF THE INVENTION

Accordingly, the present invention has been made keeping in mind the above problems occurring in the prior art, and an aspect of the present invention is to provide an optical switch, which has advantages of an MEMS optical switch and a waveguide optical switch including lower electric power consumption, an easier packaging process, and a faster switching speed.

Additional aspects and/or advantages of the invention will be set forth in part in the description which follows and, in part, will be obvious from the description, or may be learned by practice of the invention.

The above and/or other aspects are achieved by providing an optical switch including an input waveguide connected to an input optical fiber through which an optical signal is inputted, and a plurality of output waveguides connected to a plurality of output optical fibers through which the optical signal is outputted. An actuator is positioned between the input waveguide and the output waveguides, and has an MEMS structure including a fixed part and a moving part connected to the fixed part by a spring to move by a predetermined force. Additionally, a plurality of moving waveguides are fabricated on the moving part of the actuator and move in the same direction the moving part moves in such a way that the first ends of the moving waveguides correspond in position to the input waveguide, and the second ends of the moving waveguides correspond in position to the output waveguides.

The optical switch according to the present invention has a structure in which the moving waveguides move by the actuator with the MEMS structure to selectively connect the input waveguide to the output waveguides, thereby switching the optical signal. Accordingly, the optical switch is advantageous in that a response speed is faster, a smaller amount of an electric power is consumed to use the optical switch, and it is easier to connect the optical switch to optical fibers.

Additionally, the optical switch may further include an actuator driving part to move the moving part of the actuator using an electrostatic force. In this regard, the actuator driving part includes a comb-shaped moving electrode integrally connected to an end of the moving part of the actuator, and a comb-shaped fixed electrode installed at a predetermined distance from the moving electrode. At this time, the moving electrode and the moving part integrally assembled with the moving electrode move by an electrostatic force generated by a predetermined voltage applied to the moving electrode and the fixed electrode.

The above and/or other aspects are achieved by providing a method of producing an optical switch including forming a cavity on an upper side of a first silicone substrate, bonding a second silicone substrate to the upper side of the first silicone substrate on which the cavity is formed, polishing the second silicone substrate to a predetermined thickness, forming an electrode layer with a predetermined thickness on the polished second silicone substrate, etching the electrode layer to form an electrode pattern for a mask used to form a MEMS structure, forming a plurality of waveguides including clads and cores of the second silicone substrate and the electrode pattern, and etching the second silicone substrate using the electrode pattern as the mask to form the MEMS structure.

Furthermore, the method may further include forming an alignment mark on a lower side of the first silicone substrate, thus locating the cavity, electrode pattern, and waveguides based on a position of the alignment mark when the cavity, electrode pattern, and waveguide are formed.

The forming of the waveguides includes depositing a lower cladding layer on the second silicone substrate and electrode pattern, forming the cores on the lower cladding layer, depositing an upper cladding layer on the lower cladding layer on which the cores are formed, and removing a portion of the lower cladding layer except for a portion in which the waveguides are to be formed.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

FIGS. 3A and 3B illustrate an optical switch according to the first embodiment of the present invention.

FIG. 3A illustrates the optical switch 30 in an offset state. The optical switch 30 includes an input waveguide 32 connected to an input optical fiber 31 through which an optical signal is inputted, a plurality of output waveguides 34a, 34b connected to two or more output optical fibers 33 through which the optical signal is outputted, a plurality of moving waveguides 35a, 35b for connecting the input waveguide 32 to the output waveguides 34a, 34b, and an actuator 37 provided with a fixed part 38 and mounted on a predetermined base (not shown) and a moving part 36. At this time, the moving part 36 is connected to the fixed part 38 by a spring and assembled with the moving waveguides 35a, 35b. The moving part 36 perpendicularly moves by a predetermined force.

The input waveguide 32 and output waveguides 34a, 34b are fixedly installed on a wafer, and connected to an input optical fiber 31 and output optical fibers 33a, 33b used as a signal transmitting medium according to a bonding process. The two output waveguides 34a, 34b are shown in FIG. 3A, but the number of the output waveguides 34a, 34b may be proportionally increased with the number of paths of the optical signal, thus the number of the moving waveguides 35a, 35b is proportionally increased with the number of the output waveguides 34a, 34b.

The output waveguides 34a, 34b are connected to the different output optical fibers 33a, 33b. The arrangement of the output waveguides 34a, 34b is not limited, but it is preferable that the output waveguides 34a, 34b are connected to the output optical fibers 33a, 33b in parallel as shown in FIG. 3A so as to easily connect the output waveguides 34a, 34b to the output optical fibers 33a, 33b and to easily install the moving waveguides 35a, 35b.

Additionally, the number of the moving waveguides 35a, 35b is the same as that of the output waveguides 34a, 34b. The moving waveguides 35a, 35b move perpendicularly in such a way that the first ends of the moving waveguides 35a, 35b correspond in position to the input waveguide 32, and the second ends of the moving waveguides 35a, 35b correspond in position to the output waveguides 34a, 34b. At this time, some of the moving waveguides 35 may be slightly bent.

FIG. 3A illustrates an enlarged view of the moving waveguides 35a, 35b to show the structure of the waveguides. In this regard, the waveguides 32, 34a, 34b, 35a, 35b have very small diameter, thus most of the moving waveguides 35a, 35b are almost straight. Further, the moving waveguides 35a, 35b are assembled with the moving part 36 of the actuator 37 having an MEMS structure to integrally move with the moving part 36.

The actuator 37 has the MEMS structure, and includes the fixed part 38 which does not move, and the moving part 36 connected to the fixed part 38 by the spring and perpendicularly moving by a predetermined electrostatic force, or energy, such as heat.

The moving waveguides 35a, 35b assembled with the moving part 36 are perpendicularly arranged so that the input waveguide 32 is selectively connected to a plurality of output waveguides 34a, 34b while the moving part 36 perpendicularly moves.

A detailed description will be given of the operation of the optical switch, below.

FIG. 3A illustrates the operation of the optical switch in an initial state when the actuator 37 does not move, and FIG. 3B illustrates the operation of the optical switch when the actuator 37 moves.

As shown in FIG. 3A, when the moving part 36 of the actuator 37 does not perpendicularly move in the initial state, a first end of a first moving waveguide 35a corresponds in position to the input waveguide 32, and a second end of the first moving waveguide 35a corresponds in position to a first output waveguide 34a. At this time, the optical signal passing through the input optical fiber 31 advances through the first moving waveguide 35a to a first output optical fiber 33a connected to the first output waveguide 34a.

Furthermore, when the actuator 37 perpendicularly and downwardly moves as shown in FIG. 3b, the input waveguide 32 is connected to a second output waveguide 34b through a second moving waveguide 35b. Accordingly, the optical signal passing through the input optical fiber 31 advances through the second moving waveguide 35b to a second optical fiber 33b connected to the second output waveguide 34b.

Therefore, the optical signal passing through the input waveguide 32 advances through any one path of two switching paths (path 1, and path 2) selected by the actuator 37.

FIGS. 3A and 3B illustrate only the two switching paths through which the optical signal passes, but the number of the switching paths may be proportionally increased with the number of the moving waveguides 35 and output waveguides 34.

FIGS. 4A and 4B illustrate an optical switch having the four switching paths according to the second embodiment of the present invention, in which optical signals of FIGS. 4A and 4B pass through the different switching paths.

The optical switch of FIGS. 4A and 4B includes an input waveguide 42 which does not move, four output waveguides 44a, 44b, 44c, 44d arranged in a direction toward which an actuator 47 moves, the actuator 47 connected to a fixed part 48 by a spring and having a moving part 46 perpendicularly moving by a predetermined force, and four moving waveguides 45a, 45b, 45c, 45d positioned at an upper part of the moving part 46 of the actuator 47 and arranged in a direction toward which the actuator 47 moves. At this time, the moving waveguides 45a, 45b, 45c, 45d perpendicularly move in such a way that the first ends of the moving waveguides 45a, 45b, 45c, 45d correspond in position to the input waveguide 42, and the second ends of the moving waveguides 45a, 45b, 45c, 45d correspond in position to the output waveguides 44a, 44b, 44c, 44d.

As shown in FIG. 4A, when the actuator 47 does not move in an initial state, the input waveguide 42 corresponds in position to a first end of a first moving waveguide 45a, and a second end of the first moving waveguide 45a corresponds in position to a first output waveguide 44a. At this time, the first moving waveguide 45a is a bottom-most moving waveguide of the four moving waveguides, and the first output waveguide 44a is a bottom-most output waveguide of the four output waveguides. Accordingly, an optical signal passing through an input optical fiber 41 advances to a first output optical fiber 43a.

Furthermore, when the moving part 46 of the actuator 47 downwardly and perpendicularly moves by a predetermined distance, a first end of a second moving waveguide 45b corresponds in position to the input waveguide 42, and a second end of the second moving waveguide 45b corresponds in position to a second output waveguide 44b as shown in FIG. 4B. At this time, the optical signal passing through the input optical fiber 41 is transmitted to a second output optical fiber 43b.

Additionally, the moving part 46 of the actuator 47 downwardly and perpendicularly moves in such a way that a third moving waveguide 45c corresponds in position to the input waveguide 42 and a third output waveguide 44c to transmit the optical signal passing through the input optical fiber 41 to a third optical fiber 43c, and a fourth moving waveguide 45d corresponds in position to the input waveguide 42 and a fourth output waveguide 44d to transmit the optical signal passing through the input optical fiber 41 to a fourth optical fiber 43d.

In other words, the optical signal passing through the input optical fiber 41 is selectively transmitted to the first 43a, second 43b, third 43c, or fourth output optical fiber 43d by adjusting a position of the moving part 46 of the actuator 47.

In this regard, the position of the moving part 46 of the actuator 47 may be adjusted by an electrostatic force or heat. A moving mechanism of the moving part of the MEMS structure is well known in the art.

Figure 5:
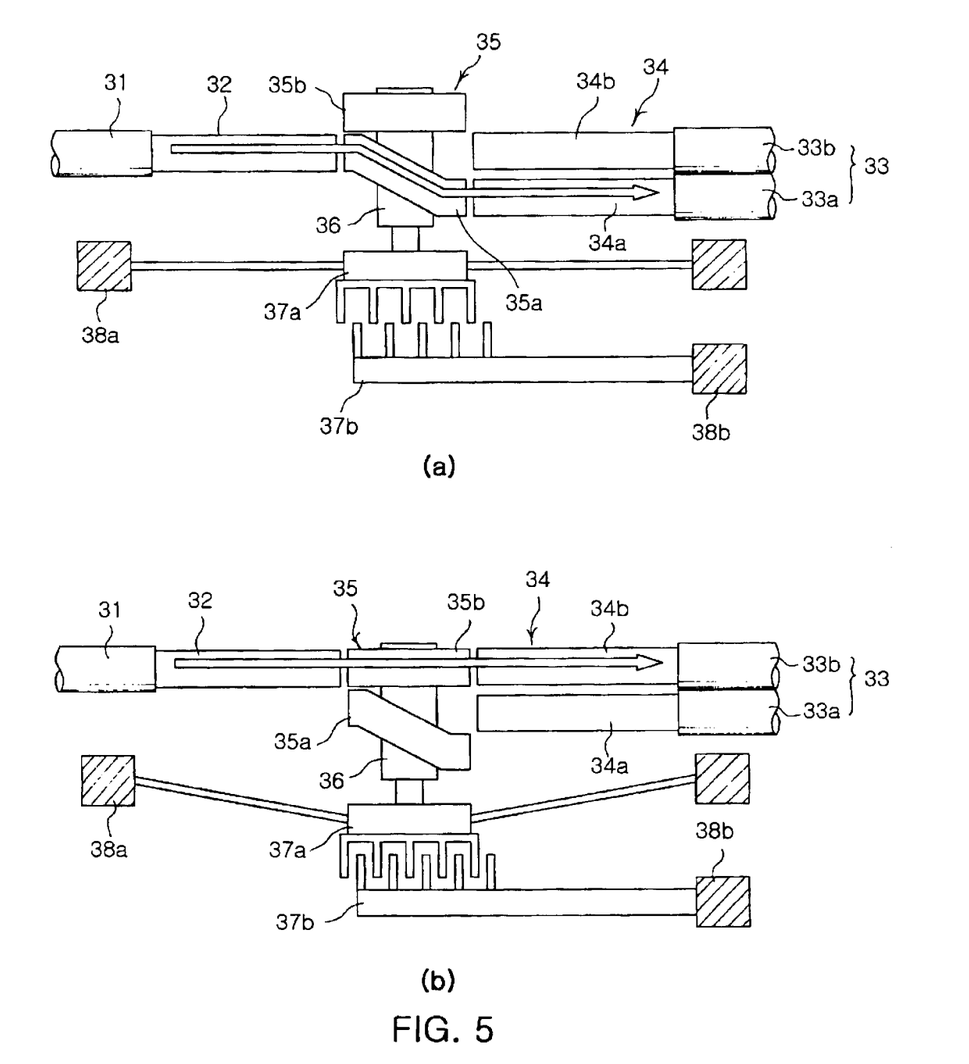
FIGS. 5A and 5B illustrate an optical switch according to the third embodiment of the present invention.

FIGS. 5A and 5B illustrate an optical switch according to the third embodiment of the present invention, in which a path of an optical signal is switched using an electrostatic force, usually used in a MEMS technology field.

Figure 3:
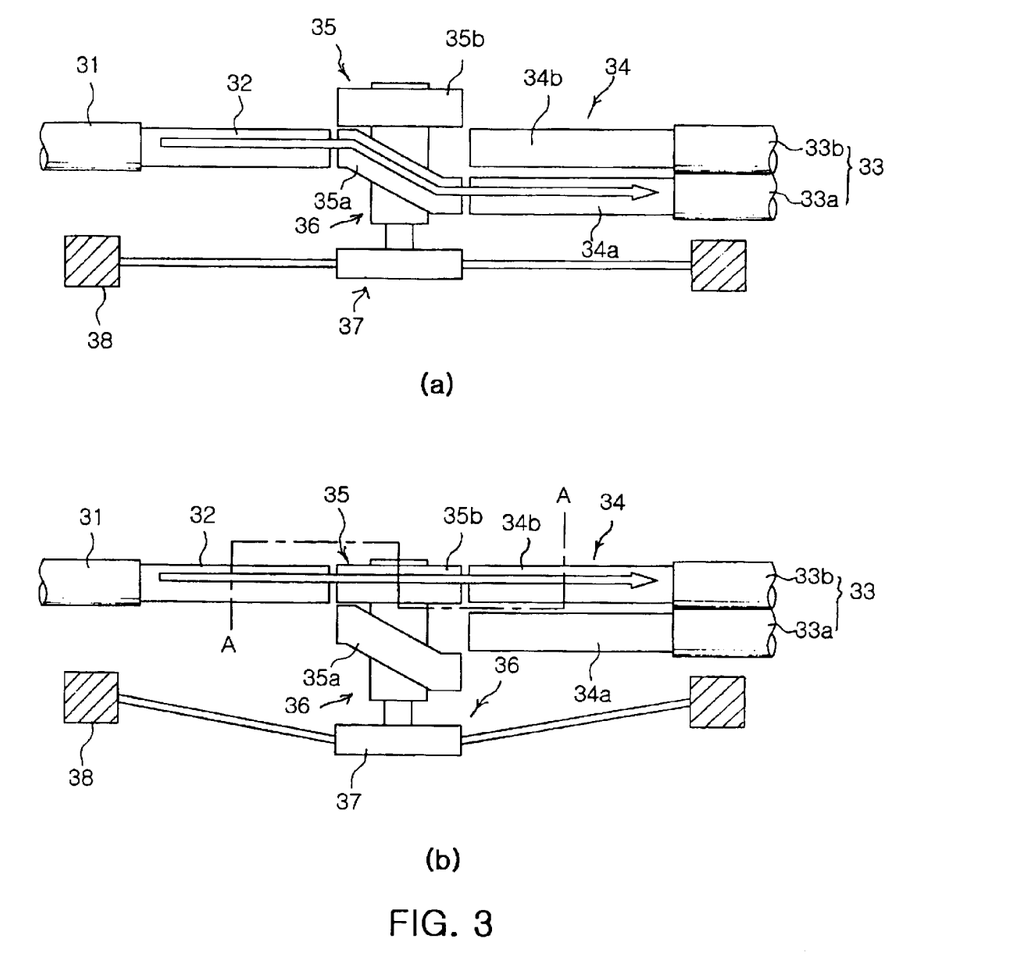
FIGS. 3A and 3B illustrate an optical switch according to the first embodiment of the present invention.

In FIGS. 5A and 5B, a comb-shaped moving electrode 37a is formed at an end of the actuator 37 of FIG. 3, and a fixed electrode 37b is formed at a predetermined distance from the moving electrode 37a.

When a voltage is not applied to the moving electrode 37a and fixed electrode 37b, a moving part 36 does not move, and a first moving waveguide 35a is positioned between an input waveguide 32 and a first output waveguide 34a as shown in FIG. 5A.

On the other hand, when the voltage is applied to the moving electrode 37a and fixed electrode 37b, a predetermined voltage difference occurs between the moving electrode 37a and fixed electrode 37b to generate an electrostatic force, thus the moving electrode 37a and the moving part 36 integrally assembled with the moving electrode 37a downwardly and perpendicularly move. At this time, a second moving waveguide 35b is positioned between the input waveguide 32 and a second output waveguide 34b as shown in FIG. 5B.

A moved distance of the moving electrode 37a is proportionally increased with an intensity of the electrostatic force, and the electrostatic force generated between the moving electrode 37a and fixed electrode 37b varies according to the voltage difference between the moving electrode 37a and fixed electrode 37b, thus the moved distance of the moving electrode 37a is controlled by adjusting the level of the voltage applied to the moving electrode 37a and fixed electrode 37b. Accordingly, the movement of the actuator 37 is controlled by adjusting a voltage signal, thereby controlling a path of the optical signal.

Figure 6:
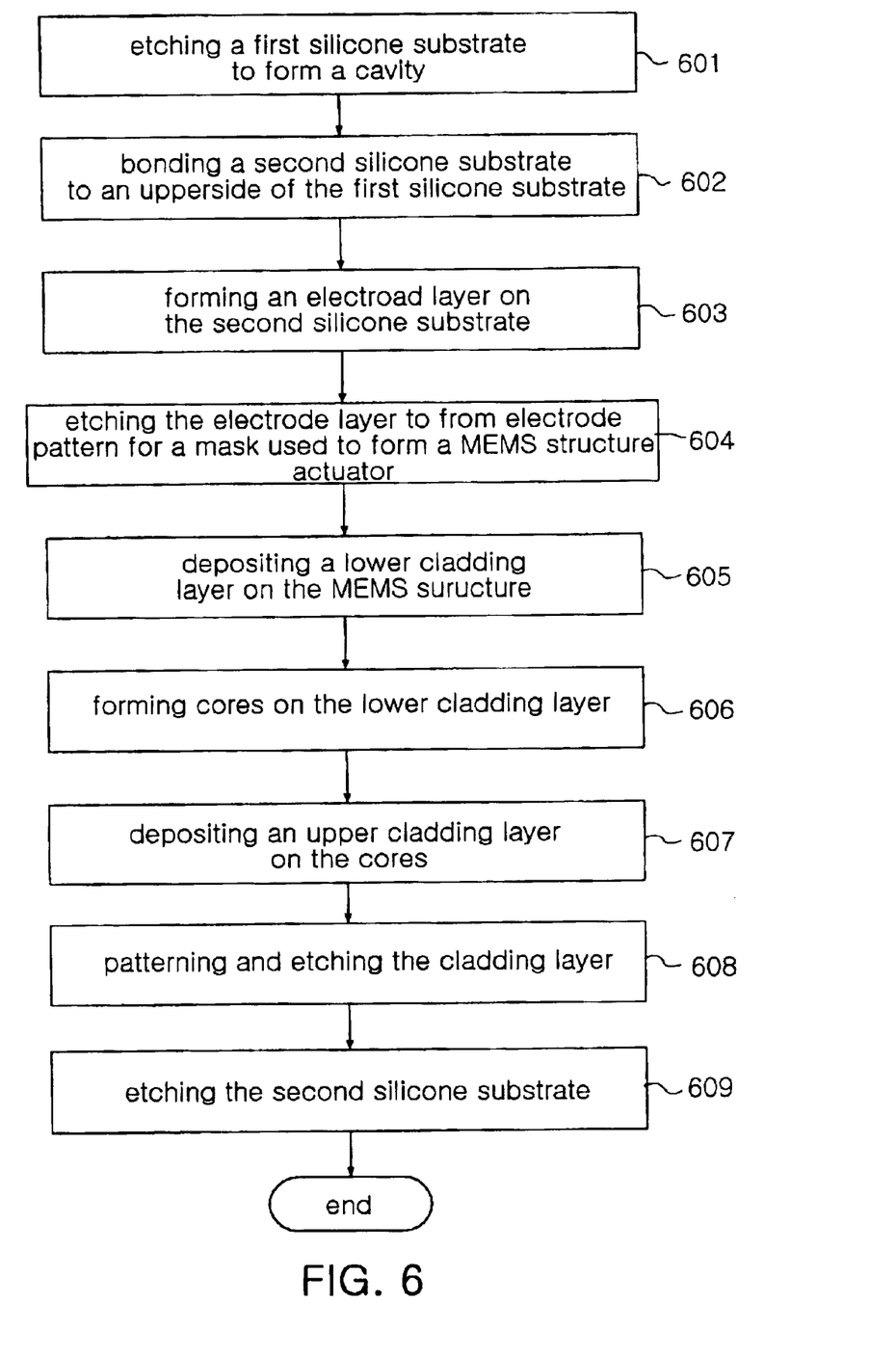
FIG. 6 is a flow chart illustrating the production of an optical switch according to the present invention.

As described above, the optical switch of the present invention has the MEMES structure and waveguides, and its production is conducted as shown in FIG. 6.

A detailed description will be given of the production of the optical switch referring to FIGS. 6 and 7A to 7J.

A cavity 71b on which moving parts 36, 46 of actuators 37, 47 are to be positioned is formed on a first silicone substrate 71 supporting the actuators and waveguides in operation 601.

Figure 7:
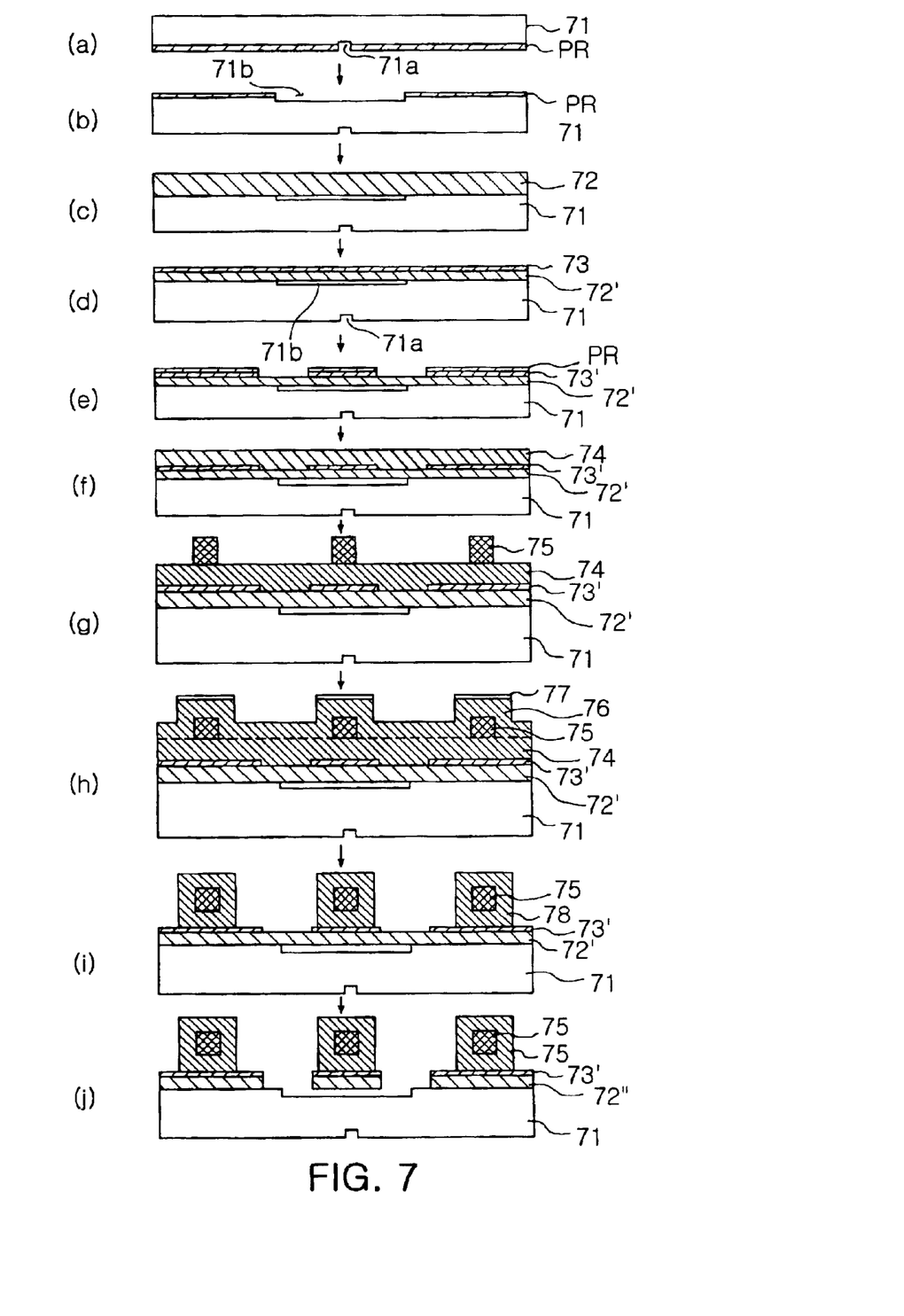
FIGS. 7A to 7J are sectional views illustrating the production of the optical switch according to the present invention.

With reference to FIG. 7A, an alignment mark 71a is formed on a lower side of a first silicone substrate 71 to set base positions so as to precisely align the moving parts 36, 46 of the actuators 37, 47 on the cavity 71b. A photoresist pattern (PR pattern) is formed on the lower side of the first silicone substrate 71 according to a lithography process, and etched to form the alignment mark 71a. A size of the alignment mark 71a is specifically limited.

Referring to FIG. 7B, the cavity 71b corresponding in position to the alignment mark 71a on the lower side of the first silicone substrate 71 is formed on an upper side of the first silicone substrate 71 in the same manner as the case of the formation of the alignment mark 71a.

Turning to FIG. 7C, the remaining photoresist pattern is removed, a second silicone substrate 72 is bonded to the upper side of the first silicone substrate 71 and is polished to a predetermined thickness in operation 602. In this regard, the actuators 37, 47 are formed using the second silicone substrate 72.

A conductive metal is deposited on the polished second silicone substrate 72' to form a metal layer 73 in operation 603, as shown in FIG. 7D. The metal layer 73 is used as a dry-etching mask for the actuators 37, 47, and is used as an electrode after the optical switch is completed. At this time, the metal layer 73 is deposited according to a sputtering or an evaporation process in a predetermined thickness. The thickness of the metal layer 73 depends on an etching selective ratio of the polished second silicone substrate 72'.

As shown in FIG. 7E, a photoresist layer is covered on the metal layer 73 to form the actuators 37, 47, and a portion of the metal layer which is not masked is wet- or dry-etched using the photoresist layer as an etching mask to form an electrode pattern 73' used as a mask in operation 604. In this regard, a mask pattern is patterned based on the alignment mark 71a. The polished second silicone substrate 72' may be etched using the electrode pattern 73' as the mask to complete the actuators 37, 47. However, in the present invention, the polished second silicone substrate 72' is left unetched before waveguides 32, 34 are formed.

Referring to FIG. 7F, a lower clad layer 74 is formed on an upper side of the polished second silicone substrate 72' on which the electrode pattern 73' is formed in operation 605.

Turning to FIG. 7G, cores 75 are formed on the lower clad layer 74 in operation 606. At this time, the cores 75 correspond in position to the moving waveguides 35, 45 of FIGS. 3 and 4 based on the alignment mark 71a.

As shown in FIG. 7H, upper clad layers 76 are then formed on the cores 75 in operation 607.

the metal layer 77 used as etching mask is deposited according to a sputtering or an evaporation process in a predetermined thickness and patterned in the same manner as the case of 7E.

Figure 4:
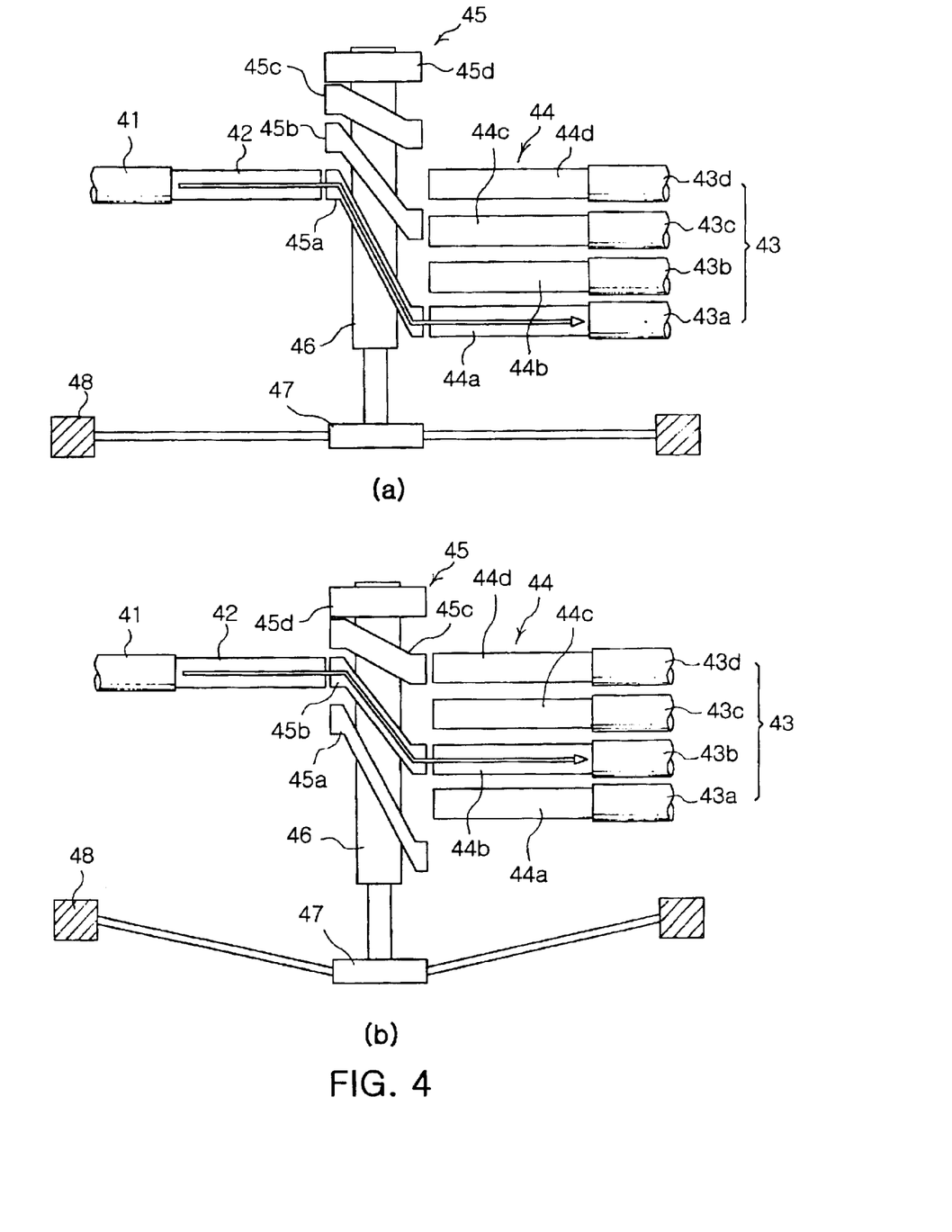
FIGS. 4A and 4B illustrate an optical switch according to the second embodiment of the present invention.

A portion of the upper and lower clad layers is etched using etching mask 77 to form the input waveguides 32, 42, the moving waveguides 35, 45, the output waveguides 34, 44 of FIGS. 3 and 4 in operation 608.

Generally, a waveguide may be classified into a silica-based waveguide and a polymer-based waveguide according to a material of the waveguide, and all of the above two-types of waveguides may be applied to the optical switch according to the present invention. FIGS. 7F to 7I illustrate a FHD process widely used to form the waveguide.

An exposed portion of the polished second silicone substrate 72' is etched using the electrode pattern 73' formed in the operation 604 as the mask to complete the MEMS structures, that is, the actuators 37, 47 in operation 609.

In this regard, the actuators 37, 47 which are the MEMS structures formed on the second silicone substrate 72, and the waveguides are arranged based on the alignment mark 71a formed on the lower side of the first silicone substrate 71. Additionally, the moving parts 36, 46 of the actuators 37, 47 are positioned in the cavity 71b of the first silicone substrate 71, and the moving waveguides 35, 45 are formed on the moving parts 36, 46.

FIG. 7J is a sectional view of the optical switch according to the present invention, taken along the line A–A' of FIGS. 3A and 3B.

Referring to FIG. 7J, the input waveguide 32, output waveguide 34, and moving waveguide 35 are located on the same horizontal plane as each other, and the moving waveguide 35 moves in a predetermined direction on the horizontal plane on which the input waveguide 32, output waveguide 34, and moving waveguide 35 are located.

Further, the moving waveguide 35, the moving parts 36, 46 of the actuators 37, 47, and the cavity 71b are perpendicularly arranged in a line, and integrally move.

As described above, the optical switch according to the present invention includes waveguides each positioned at an input side and an output side thereof, thus a packaging process is easily conducted by bonding the optical switch to optical fibers. Additionally, an amount of an electric power consumed to use the optical switch is smaller and a response speed is faster because a switching function is realized by an MEMS structure.

As apparent from the above description, the present invention provides to an optical switch having a structure in which an input and an output part of the optical switch connected to optical fibers are realized by waveguides, and a switching part of the optical switch is realized by an MEMS structure driving an moving waveguide connecting an input waveguide to an output waveguide. Therefore, the optical switch of the present invention is advantageous in that a smaller amount of an electric power is consumed to use an optical switch, a response speed is faster, a packaging process is simple and easy to conduct.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical switch, comprising:
   an input waveguide connected to an input optical fiber through which an optical signal is inputted;
   a plurality of output waveguides connected to a plurality of output optical fibers through which the optical signal is outputted;
   an actuator positioned between the input waveguide and the output waveguides, and having a micro electro mechanical systems (MEMS) structure including a fixed part and a moving part connected to the fixed part by a spring to move by a predetermined force; and
   a plurality of moving waveguides assembled with the moving part of the actuator and moving in a same direction as a movement of the moving part in such a way that first ends of the moving waveguides correspond in position to the input waveguide, and second ends of the moving waveguides correspond in position to the output waveguides.

2. The optical switch as set forth in claim 1, further comprising an actuator driving part to move the moving part of the actuator using an electrostatic force.

3. The optical switch as set forth in claim 2, wherein the actuator driving part comprises:
   a comb-shaped moving electrode integrally connected to an end of the moving part of the actuator; and
   a comb-shaped fixed electrode installed at a predetermined distance from the moving electrode,
   whereby, the moving electrode and the moving part of the actuator integrally assembled with the moving electrode move using an electrostatic force generated by a predetermined voltage applied to the moving electrode and the fixed electrode.

4. A method of producing an optical switch, comprising:

forming a cavity on an upper side of a first silicone substrate;

bonding a second silicone substrate to the upper side of the first silicone substrate on which the cavity is formed;

polishing the second silicone substrate to a predetermined thickness;

forming an electrode layer with a predetermined thickness on the polished second silicone substrate;

etching the electrode layer to form an electrode pattern for a mask used to form a micro electro mechanical systems (MEMS) structure;

forming a plurality of waveguides including clads and cores of the second silicone substrate and the electrode pattern; and etching the second silicone substrate using the electrode pattern as the mask to form the MEMS structure.

5. The method as set forth in claim 4, further comprising forming an alignment mark on a lower side of the first silicone substrate, thus locating the cavity, electrode pattern, and waveguides based on a position of the alignment mark when the cavity, electrode pattern, and waveguide are formed.

6. The method as set forth in claim 4, the forming of the waveguides comprises:

depositing a lower cladding layer on the second silicone substrate and electrode pattern;

forming the cores on the lower cladding layer;

depositing an upper cladding layer on the lower cladding layer on which the cores are formed; and removing a portion of the lower cladding layer except for a portion in which the waveguides are to be formed.

* * * * *